United States Patent [19]

Willis

[11] Patent Number: 4,893,926
[45] Date of Patent: Jan. 16, 1990

[54] FOCUSING FOR OPTICAL PRINT HEADS
[75] Inventor: Roger L. Willis, Churchville, N.Y.
[73] Assignee: Eastman Kodak Company, Rochester, N.Y.
[21] Appl. No.: 29,117
[22] Filed: Mar. 23, 1987
[51] Int. Cl.$^4$ .................... G06K 15/12; G03G 15/04
[52] U.S. Cl. .................................. 356/123; 355/238
[58] Field of Search .................. 356/123, 124, 124.5, 356/125; 355/44, 55, 238

[56] References Cited

U.S. PATENT DOCUMENTS

| | | | |
|---|---|---|---|
| 3,250,177 | 5/1966 | Shack | 356/124.5 |
| 4,096,486 | 6/1978 | Pfeifer et al. | 346/107 R |
| 4,317,137 | 2/1982 | Tompkins | 358/286 |
| 4,427,275 | 1/1984 | Stalzer | 346/107 R |
| 4,435,064 | 3/1984 | Tsukada et al. | 355/1 |
| 4,455,562 | 6/1984 | Dolan et al. | 346/107 R |
| 4,475,115 | 10/1984 | Garbe et al. | 346/108 |
| 4,478,504 | 10/1984 | Tanaka | 355/1 |
| 4,532,526 | 7/1985 | Behrens et al. | 346/107 R |
| 4,585,342 | 4/1986 | Lin et al. | 356/124 |
| 4,596,995 | 6/1986 | Yamakawa et al. | 346/160 |
| 4,605,944 | 8/1986 | Ishii et al. | 357/45 |
| 4,605,970 | 8/1986 | Hawkins | 358/265 |

FOREIGN PATENT DOCUMENTS 60-37575(A) 2/1985 Japan.
60-114890(A) 6/1985 Japan.
62-147472(A) 7/1987 Japan.

OTHER PUBLICATIONS

Brock, G. C., "The MTF as an Aid to Focusing Aerial Cameras", Conference: Image Assessment & Specification, Rochester, N.Y., (May 20-22, 1974), pp. 193-201.
Perrin et al., "Photographic Sharpness and Resolving Power. II"; *Journal of the Optical Society of America*, vol. 41, No. 4, (Apr. 1951), pp. 265-272.
"Accepted Standard for 16-mm Projection", *International Projectionist*, Jul. 1952, pp. 23-24.
"Visual Determination of Optimal Focus in a Wafer Stepper"; *IBM Technical Disclosure Bulletin*, vol. 29, No. 2, (Jul. 1986), pp. 681-682.

Primary Examiner—Richard A. Rosenberger
Attorney, Agent, or Firm—Milton S. Sales

[57] ABSTRACT

A device for generating printed output has an array of point light sources focused onto a photosensitive surface. The array is spaced from the surface substantially at the position of best focus by generating a pattern of activated and unactivated light sources along the array such that a pair of light sources which lead to the creation of an image on the output are separated by a light source which does not lead to the creation of an image. Since the image size grows in width as the focus decreases, the width of the space between images can be used as a focusing gauge, and appropriate adjustments can be made to maximize the width of the space.

7 Claims, 3 Drawing Sheets

FOCUSING FOR OPTICAL PRINT HEADS

BACKGROUND OF THE INVENTION

1. Cross Reference to Related Application

This application is related to commonly assigned, co-pending U.S. patent applications Ser. No. 884,944 entitled "IMAGING LENS ARRAY AND OPTICAL PRINT HEAD," filed in the name of K. C. Koek et al on July 11, 1986; and Ser. No. 940,694, entitled "ELECTROPHOTOGRAPHIC REPRODUCTION APPARATUS AND METHOD WITH SELECTIVE SCREENING," filed in the name of G. N. Tsilibes et al, on Dec. 11, 1986, which is a continuation-in-part of U.S. patent applications Ser. No. 809,548 and 809,549, both filed on Dec. 16, 1985.

2. Field of the Invention

This invention relates generally to optical print heads, and, more particularly to focusing such heads.

3. Description of the Prior Art

High speed optical printing devices used in data processing systems include point light sources such as light emitting diodes (LED's), photodiodes, or the like focused on a photosensitive surface. Focusing the light from such a source onto the photosensitive surface is critical to maintain high resolution and good exposure uniformity. Such focusing is generally done by trial-and-error methods with the aid of an optical test pattern. By the present invention, I have provided for greater ease and reliability in the focusing process.

SUMMARY OF THE INVENTION

The present invention, a device for generating printed output has an array of point light sources focused onto a photosensitive surface. The array is spaced from the surface substantially at the position of best focus by generating a pattern of activated and unactivated light sources along the array such that a pair of light sources which lead to the creation of an image on the output are separated by a light source which does not lead to the creation of an image. Since the image size grows in width as the focus decreases, the width of the space between images can be used as a focusing gauge, and appropriate adjustments can be made to maximize the width of the space.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENT

The present invention will be directed in particular to elements forming part of, or cooperating more directly with, apparatus in accordance with the present invention. It is to be understood that elements, components, and/or sub-components not specifically shown or described may take various forms well known to those skilled in the art.

To assist in understanding the present invention, an electrophotographic copier/printer in which the invention may be used will be briefly described. It will be understood, however, that the apparatus of the present invention can be used in other types of apparatus.

Figure 1:
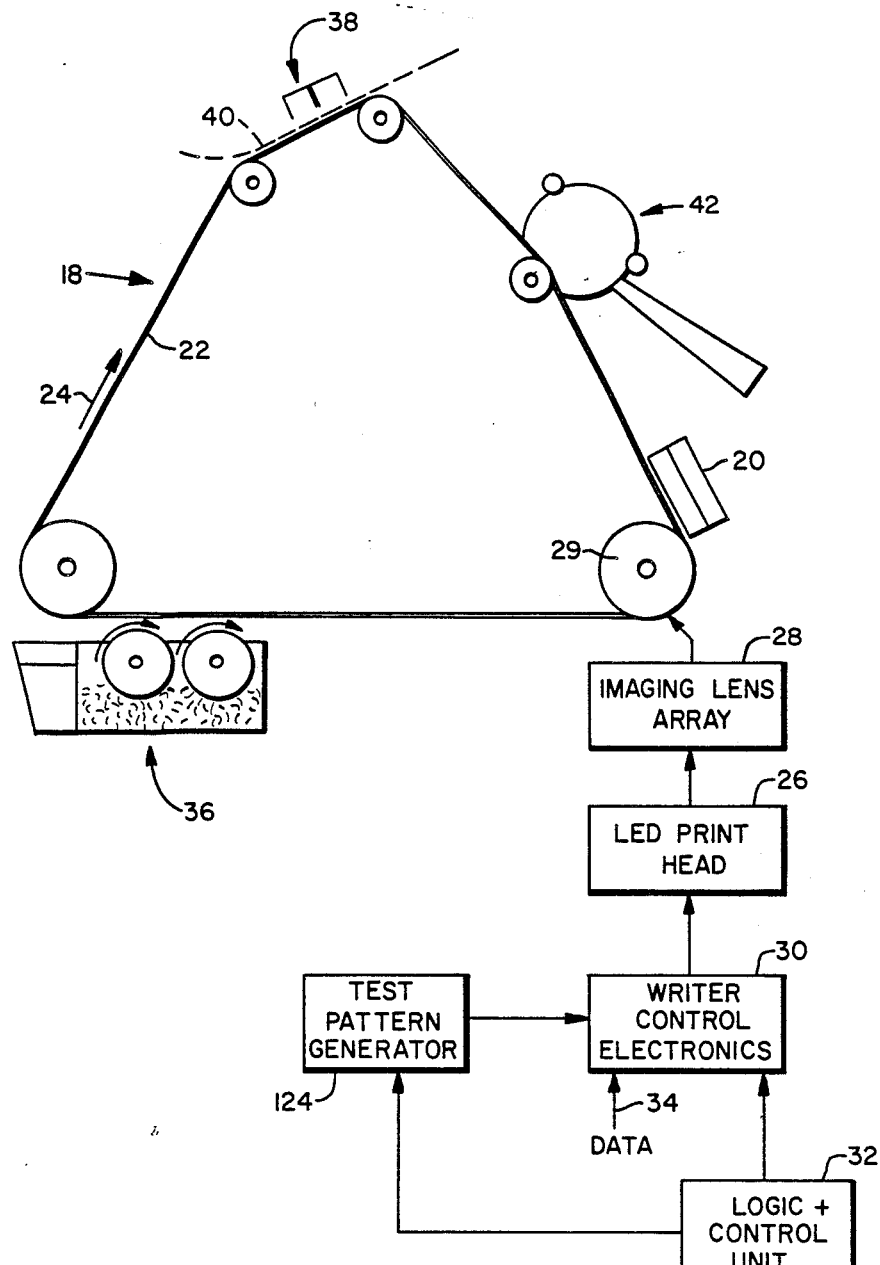
FIG. 1 is a schematic vertical section of an electrophotographic apparatus including an imaging lens array and print head suitable for being focused in accordance with the present invention.

Referring to FIG. 1, electrophotographic apparatus, generally designated 18, includes a charging station 20 for applying a uniform charge to the surface of a photoresponsive element such as a photoconductor 22. The photoconductor illustrated is an endless belt trained about a plurality of rollers and driven in the direction of an arrow 24. Light from selected LED's of a print head 26 is transmitted by an imaging lens array 28 onto the surface of photoconductor 22 as the photoconductor passes over a roller 29. The light striking the charged photoconductor selectively dissipates portions of the charge to form an electrostatic latent image on the photoconductor. Selection of the specific LED's of the print head which are activated at any given time is effected by means of writer control electronics 30, a logic and control unit (LCU) 32, and the data entering along line 34.

A magnetic brush development station 36 transfers toner particles to the photoconductor for developing the latent image. The resulting toned image then travels to a transfer and detack station 38 where the image is transferred to a copy sheet fed from a supply, not shown, along path 40. After the photoconductor passes through transfer and detack, it is cleaned at station 42 and is available for another cycle of operation.

Figure 2:
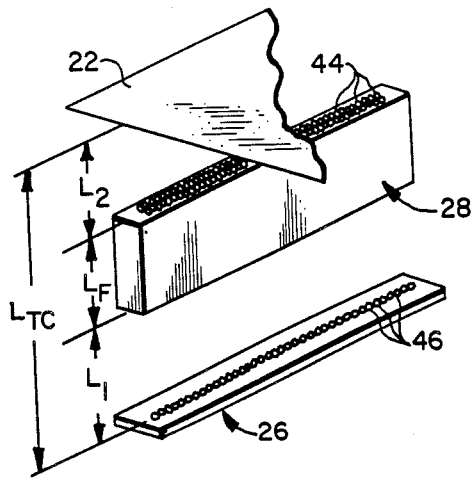
FIG. 2 is a schematic perspective view of an imaging lens array and print head in accordance with the prior art and suitable for being focused in accordance with the present invention.

Photoconductor 22, LED print head 26, and imaging lens array 28 are schematically shown in FIG. 2. Imaging lens array 28 has a staggered, two-row bundle of gradient index optical fibers 44. Such arrays are commercially available as SELFOC (trademark of Nippon Sheet Glass Co., Ltd.) lenses, as described in U.S. Pat. No. 3,658,407, patented on Apr. 25, 1972. Reference may be made to that patent for details of the lens array. Print head 26 has a linear array of point light sources 46, such as LED's, photodiodes, or similar devices.

If the distances $L_1$ and $L_2$ are properly selected and equal, then there is obtained an erect image at a magnification of one (1) of the light sources at the surface of the photoconductor. Distance $L_{TC}$ in FIG. 2 represents the total conjugate of the lens (i.e., the distance between the object and images planes). Accordingly:

$$L_1 = L_2,$$

and $$L_{TC} = L_F + L_1 + L_2$$

where $L_F$ is the length of individual optical fibers 44 of array 28. For optimum resolution, dimensions $L_{TC}$, $L_1$, and $L_2$ must be accurately set and maintained.

Figure 3:
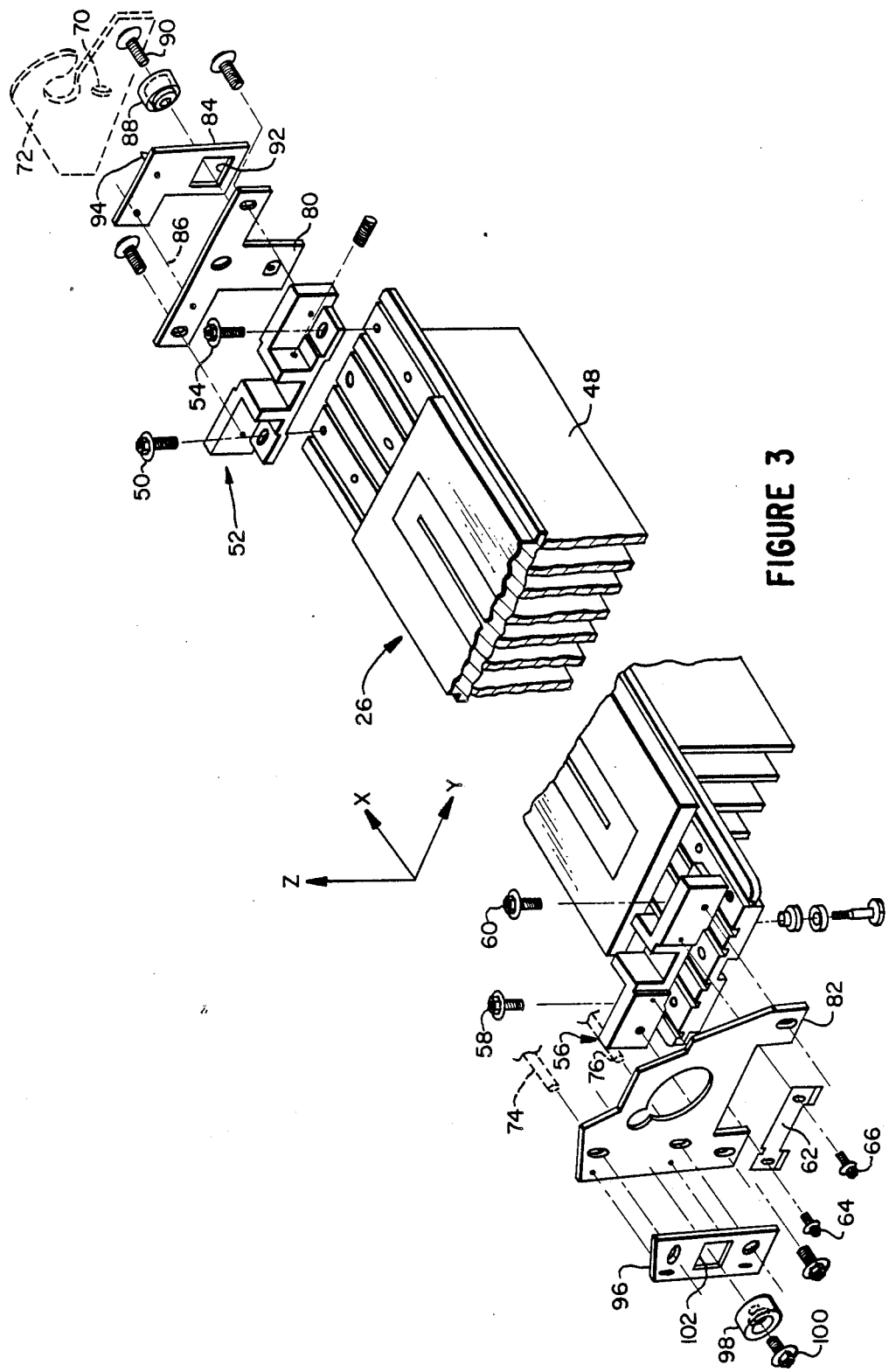
FIG. 3 is a perspective view of a print head and locating means for the apparatus of FIG. 1.

Referring now to FIG. 3, print head 26 is a modified, commercially-available unit with a linear array of LED's, a transparent faceplate covering the LED's, and heat-conducting cooling vanes 48. An interface block 52 is slidably mounted for movement in the Y-direction on print head 26 by a pair of screws 50 and 54 which pass through elongated holes in the block. A second interface block 56 is slidably mounted in the Y-direction on print head 26 by a pair of screws 58 and 60 which pass through respective elongated holes in block 56. A flexible steel plate 62 is mounted at its ends to block 56 by a pair of screws 64 and 66 which also pass through elongated holes to permit vertical (Z-direction) movement of the plate relative to the interface block.

During assembly, an imaging lens array 28 (FIG. 2) is attached to interface block 52 and steel plate 62 in a manner described in commonly assigned, co-pending U.S. patent application Ser. No. 884,944, filed in the name of K. C. Koek et al on July 11, 1986, the disclosure of which is herein incorporated by reference.

For optimum resolution and exposure uniformity, the print head is mounted on electrophotographic apparatus 18 such that the LED array is spaced from the surface of photoconductor 22 by the total conjugate distance $L_{TC}$ (FIG. 2), and the imaging lens array itself must be spaced by distance $L_2$ from the photoconductor. To that end, adjustment means have been provided, whereby the distance between the LED array of print head 26 and the surface of photoconductor 22 can be adjusted to a position of best focus, as determined in a manner hereinafter explained in detail.

Three locating structures are provided on the electrographic apparatus. The locating structures include a V-shaped opening 70 in a plate 72, and a pair of pins 74 and 76 which extend from a mechanism plate (not shown) in the electrophotographic apparatus. Opening 70 and pins 74 and 76 are fixed in the electrographic apparatus mainframe at accurately known positions relative to the bearings of roller 29 (FIG. 1). This spatial relationship is intended to be substantially invarient from machine to machine so that once set up, a print head assembly can be mounted on any apparatus without further adjustment in the field.

A pair of mounting plates 80 and 82 are fixed to print head 26 by means of screws and elongated slots for course, Z-direction adjustment. A plate 84 is held to bracket 80 for rotation about an axis 86 by a focusing dial 88 and locking screw 90. Focusing dial 88 extends through a cam follower opening 92 in plate 84 such that the rotational position of the focusing dial determines the position (in the Z-direction) of a pin 94 relative to the print head. Since pin 94 extends through V-shaped opening 70 to support the print head, the rotational position of focusing dial 88 determines the distance between the right (as viewed in FIG. 3) end of the print head and the photoconductor surface.

At the other end of the print head, a plate 96 is slidably held to bracket 82 by a second focusing dial 98 and locking screw 100. Focusing dial 100 extends through a cam follower opening 102 in plate 96 such that the rotational position of the focusing dial determines the position (in the Z-direction) of an elongated slot 104 relative to the print head. Since pin 74 extends through slot 104 to support the print head, the rotational position of focusing dial 98 determines the distance between the left (as viewed in FIG. 3) end of the print head and photoconductor surface.

Figure 4:
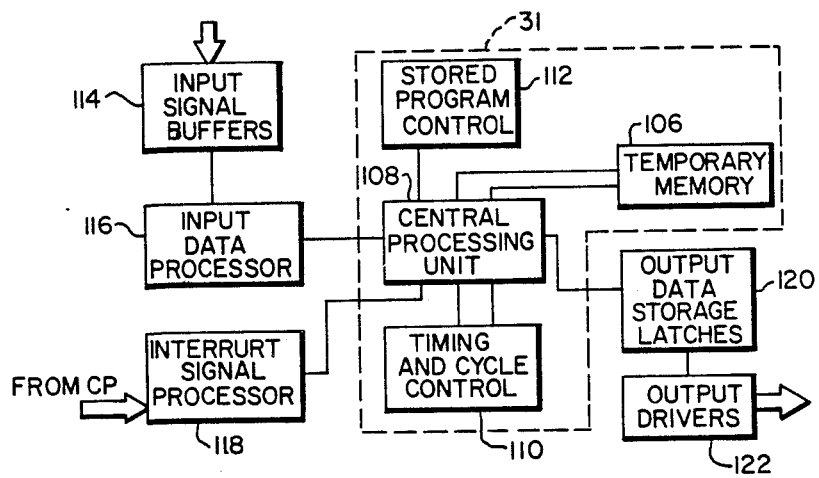
FIG. 4 is a schematic illustration of a system for controlling the apparatus shown in FIG. 1.

FIG. 4 is a block diagram of LCU 31 and interfaces between the LCU and the copier/printer apparatus, as explained in detail in commonly assigned, co-pending U.S. patent application Ser. No. 940,694, entitled "ELECTROPHOTOGRAPHIC REPRODUCTION APPARATUS AND METHOD WITH SELECTIVE SCREENING," filed on Dec. 11, 1986, in the name of G. N. Tsilibes, which is a continuation-in-part of U.S. patent applications Ser. No. 809,548 and 809,549, both filed on Dec. 16, 1985, the disclosure of which is specifically incorporated herein by reference.

Generally, the LCU consists of temporary data storage memory 106, a central processing unit 108, a timing and control unit 110, and stored program control 112. Data input and output is performed sequentially under program control. Input data are applied either through input signal buffers 114 to an input data processor 116, or through an interrupt signal processor 118. The input signals are derived from various switches, sensors, and analog-to-digital converters. The output data and control signals are applied to storage latches 120 which provide inputs to suitable output drivers 122 directly coupled to leads. One of these leads is connected to writer control electronics 30 of FIG. 1, and another to a test pattern generator 124, also shown in FIG. 1.

An input to interrupt signal processor 118 comes from an operator control panel to allow LCU 31 to receive commands, one of which is to generate a focusing test pattern for the print head. When the appropriate code is provided, a program in stored program control 112 is called up, and test pattern generator 124 is actuated. The test pattern generator supplies a test pattern signal to writer control electronics 30, whereby the LED's of the print head are activated and unactivated as directed by image information supplied from the test pattern generator to create a charge pattern on photoconductor 22, and ultimately on a copy sheet.

Various test patterns, selectable from the known art, may be stored in test pattern generator 124. However, in accordance with the present invention, the test patterns should include one which provides a pattern of activated and unactivated light sources along the LED array such that a pair of light sources which result in an image on the output (i.e., a copy sheet) are separated by a light source which does not result in an image. That is, in a direct positive process, unlighted LED's result in images on the copy sheet; while in reversal development, lighted LED's result in such images.

As the image focus becomes worse, the images become broader. Therefore, the width of the gap left between images by the light source which does not result in an image is a measure of the focus of the print head. By producing a test print and using focusing dials 88 and 98 to adjust the distance of the print head to the photoconductor surface to maximize the gap size, one can set up the system for best focus. Each end of the print head is independently adjustable to provide a best average focus along the head.

The test pattern program may cause every other LED to light along the head, or it may select only a relatively few LED's along the heat to light, it being important only that, in the cross-track region where focus is to be checked, at least two light sources which create a mark are separated by a light source which does not.

The invention has been described in detail with particular reference to preferred embodiments thereof, but it will be understood that variations and modifications can be effected within the spirit and scope of the invention.

What is claimed is:

1. In a device for generating printed output having an array of light sources focused across a photoresponsive surface such that there exists a predetermined distance between the surface and the light sources whereat best focus is obtained, the improvement being apparatus for locating the array substantially at the position of best focus comprising:

means for activating selected ones of the light sources along the array such that a desired pattern of activated and unactivated light sources results, said pattern being such that pairs of light sources which lead to the creation of an image on the output are separated by a light source which does not lead to the creation of an image, whereby the width of the space between the two marks provides an indication of the degree of focus of the light sources on the photoresponsive surface; and means for adjustably mounting the light sources on the device for movement relative to the photoresponsive surface such that the light sources can be moved toward and away from the surface to a position of best focus.

2. The improvement as defined in claim 1 wherein the means for activating selected ones of the light sources along the array includes:

a pattern generator for selectively activating the light sources; and a stored program for causing the pattern generator to activate the light sources in the desired pattern.

3. In a device for generating printed output having an array of light sources focused across a photoresponsive surface such that there exists a predetermined distance between the surface and the light sources whereat best focus is obtained, the improvement being apparatus for locating the array substantially at the position of best focus comprising:

means for activating every other one of a plurality of the light sources along the array such that light sources which lead to the creation of an image on the output are separated by a light source which does not lead to the creation of an image, whereby the width of the spaces between the marks provide indications of the degree of focus of the light sources on the photoresponsive surface; and means for adjustably mounting the light source array on the device for movement relative to the photoresponsive surface such that the light sources can be moved toward and away from the surface to a position of best focus.

4. In a device for generating printed output having an array of light sources focused across a photoresponsive surface such that there exists a predetermined distance between the surface and the light sources whereat best focus is obtained, the improvement being apparatus for locating the array substantially at the position of best focus comprising:

means for activating every other one of the light sources along the array such that light sources which lead to the creation of an image on the output are separated by a light source which does not lead to the creation of an image, whereby the width of the spaces between the marks provide indications of the degree of focus of the light sources on the photoresponsive surface; and means for adjustably mounting the light source array on the device for movement relative to the photoresponsive surface such that the light sources can be moved toward and away from the surface to a position of best focus.

5. A method for locating an array of light sources substantially at the position of best focus relative to a photoresponsive surface, the method comprising:

activating selected ones of the light sources along the array such that pairs of light sources which lead to the creation of an image on the output are separated by a light source which does not lead to the creation of an image, whereby the width of the space between the two marks provides an indication of the degree of focus of the light sources on the photoresponsive surface; and adjusting the position of the light sources relative to the photoresponsive surface toward a position of best focus by maximizing the width of the space.

6. A method for locating an array of light sources substantially at the position of best focus relative to a photoresponsive surface, the method comprising:

activating every other one of a plurality of the light sources along the array such as to produce a desired pattern of activated light sources wherein light sources which lead to the creation of an image on the output are separated by a light source which does not lead to the creation of an image, whereby the width of the space between the two marks provides an indication of the degree of focus of the light sources on the photoresponsive surface; and adjusting the position of the light source array relative to the photoresponsive surface toward a position of best focus by maximizing the width of the space.

7. A method for locating an array of light sources substantially at the position of best focus relative to a photoresponsive surface, the method comprising:

activating every other one of the light sources along the array such that pairs of light sources which lead to the creation of an image on the output are separated by a light source which does not lead to the creation of an image, whereby the width of the spaces between the marks provide an indication of the degree of focus of the light sources on the photoresponsive surface; and adjusting the position of the light source array relative to the photoresponsive surface toward a position of best focus by maximizing the width of the spaces.

* * * * *